US009223185B2

(12) United States Patent
Chen et al.

(10) Patent No.: US 9,223,185 B2
(45) Date of Patent: Dec. 29, 2015

(54) ELECTRO-OPTIC SILICON MODULATOR WITH ALTERNATIVE CAPACITANCE-LOADED COPLANAR WAVEGUIDE STRUCTURES

(71) Applicant: SiFotonics Technologies Co., Ltd., Woburn, MA (US)

(72) Inventors: Changhua Chen, Beijing (CN); Yanwu Zhang, Beijing (CN); Dong Pan, Andover, MA (US); Tzungi Su, Taoyuan (TW)

(73) Assignee: SiFotonics Technologies Co, Ltd., Woburn, MA (US)

( * ) Notice: Subject to any disclaimer, the term of this patent is extended or adjusted under 35 U.S.C. 154(b) by 0 days.

(21) Appl. No.: 14/454,881

(22) Filed: Aug. 8, 2014

(65) Prior Publication Data

US 2015/0043866 A1 Feb. 12, 2015

Related U.S. Application Data

(60) Provisional application No. 61/958,926, filed on Aug. 9, 2013.

(51) Int. Cl.
*G02F 1/225* (2006.01)
*G02F 1/21* (2006.01)
(52) U.S. Cl.
CPC ............ *G02F 1/2257* (2013.01); *G02F 1/2255* (2013.01); *G02F 2001/212* (2013.01); *G02F 2201/122* (2013.01)

(58) Field of Classification Search
CPC .................... G02F 2201/122; G02F 2001/212; G02F 1/2255; G02F 1/2257
USPC .......................................................... 385/3–5
See application file for complete search history.

(56) References Cited

U.S. PATENT DOCUMENTS

| 7,492,979 | B2 * | 2/2009 | Wang et al. ...................... 385/12 |
| 7,616,843 | B2 * | 11/2009 | Ishizaka ............................. 385/2 |
| 8,643,929 | B2 * | 2/2014 | Gill et al. ......................... 359/259 |
| 9,036,953 | B2 * | 5/2015 | Witzens et al. ..................... 385/2 |
| 2010/0060970 | A1 * | 3/2010 | Chen ............................. 359/245 |
| 2012/0189239 | A1 * | 7/2012 | Tu et al. ............................ 385/2 |

* cited by examiner

*Primary Examiner* — Akm Enayet Ullah
(74) *Attorney, Agent, or Firm* — Han IP Corporation

(57) ABSTRACT

Embodiments of the present disclosure provide a high-speed silicon modulator without the microwave mode conversion and provide 50-ohm impedance matching to drivers simultaneously. In one aspect, a device may include an input waveguide region, an optic splitter, two optic phase shifters, an optic splitter, and an output waveguide. The device may include two curved waveguides. Either or both of the curved waveguides may have specially doped regions including PN junctions or MOS capacitors. The PN junctions or MOS capacitors may be alternatively connected to both slots of a coplanar waveguide forming the electrodes.

10 Claims, 10 Drawing Sheets

ELECTRO-OPTIC SILICON MODULATOR WITH ALTERNATIVE CAPACITANCE-LOADED COPLANAR WAVEGUIDE STRUCTURES

CROSS-REFERENCE TO RELATED PATENT APPLICATIONS

This is a non-provisional application that claims the priority benefit of U.S. Patent Application No. 61/958,926, filed on Aug. 9, 2013, which is incorporated by reference in its entirety.

TECHNICAL FIELD

Embodiments of the present disclosure are related to silicon electro-optic modulators and, more particularly, to high-speed and low-energy consumption silicon electro-optic modulators.

BACKGROUND

Silicon electro-optic modulators play an increasing role in the field of optic communication owing to their process compatibility with CMOS technology. Standard silicon electro-optic modulators typically employ MOS capacitors or reverse-biased PN junctions to achieve a large modulation bandwidth even up to 30 GHz.

The modulation depth, i.e., the total phase change of the modulator, is proportional to the length of the modulator, thus a longer device is preferred in the point of modulation depth. For such a long modulator, a properly designed microwave traveling electrode such as a coplanar waveguide (CPW) or a coplanar strip line (CS) is required for high-speed modulation. Generally, a CPW electrode rather than a CS electrode is chosen as shown in FIG. 1 because of its ease for test and compatibility with legacy driver electrode scheme. The active phase shifter, i.e., the PN junctions or MOS capacitors, is located in one slot of the CPW and connected to one of the two ground metals (G) and the signal metal (S) by properly impurity-doped regions. This common electrode scheme constructs an asymmetric CPW because only one slot is loaded with capacitance from the electrically-connected phase shifter. There are several electromagnetic field modes in an asymmetric CPW such as the CPW even mode, odd mode, and the surface wave-like mode, with different microwave impedance for each. The CPW even mode is the needed one and excited by the driver, and the electrode is terminated by terminator with impedance equal to that of the mode. However, such an asymmetric CPW is prone to the microwave mode conversion when the excited CPW even mode is propagated along the CPW. The converted mode has impedance different from that of the CPW even mode and the terminator, thus a microwave reflection will occur due to impedance mismatch and limit the bandwidth of the modulator. FIG. 2 shows the electro-optic response of a modulator using such an asymmetric CPW electrode. The dip around 11 GHz in the response curve is caused by the impedance mismatch between terminator and the modes other than CPW even mode.

Generally, a silicon electro-optic modulator is designed with high capacitance per unit length to obtain modulation efficiency as high as possible. However, the high capacitance per unit length usually gives rise to low microwave impedance of the order 20~30 ohm. Such low impedance makes the impedance matching to the modulator driver difficult, and a specially designed driver with output impedance much lower than standard 50 ohm is required. In the meantime, the low microwave impedance of the modulator and driver increases the RF power consumption of the transmitter employing the modulator.

SUMMARY

This section highlights certain features of the inventive concept of the present disclosure, and in no way is to be interpreted as limiting the scope of the claimed subject matter as well as any deviations and derivatives thereof.

In one aspect, a device may include an input waveguide region, an optic splitter, first and second optic phase shifters, an optic splitter, and an output waveguide.

In some embodiments, the first phase shifter may include an alternative capacitive loading coplanar waveguide (ACLCPW) active phase shifter.

In some embodiments, the second phase shifter may include an ACLCPW active phase shifter or a passive curved waveguide.

In some embodiments, the first and second phase shifters may include ACLCPW active phase shifters that share one ground electrode.

In some embodiments, either of the first and second phase shifters comprises an ACLCPW active phase shifter that starts in a top slot or a bottom slot of a coplanar waveguide (CPW).

In some embodiments, the ACLCPW active phase shifter may include alternatively arranged active phase shifter segments and curved passive segments.

In some embodiments, the ACLCPW active phase shifter may include alternatively loaded active phase shifter segments in both slots of a CPW.

In some embodiments, the ACLCPW active phase shifter may start with a passive waveguide or an active phase shifter.

In some embodiments, the ACLCPW active phase shifter may end with a passive waveguide or an active phase shifter.

In some embodiments, the ACLCPW active phase shifter may include two to fifty short active phase shifter segments.

In some embodiments, a ratio of length of a plurality of active phase shifter segments of the ACLCPW active phase shifter to a horizontal distance between two of the active phase shifter segments may be in a range of 0.1 to 10 to provide a coplanar waveguide (CPW) with 50-ohm equivalent microwave impedance.

In some embodiments, the active phase shifter segments may be electrically connected to metals of a CPW.

In some embodiments, a length of each of the active phase shifter segments may be in a range of 10 um to 1.0 mm.

In some embodiments, the active phase shifter segments may be of a PN junction type or a MOS capacitor type.

In some embodiments, a length of a first segment of the active phase shifter segments may be the same as or different from a second segment of the active phase shifter segments.

In some embodiments, a length of a first segment of the curved passive segments may be the same as or different from a second segment of the curved passive segments.

In some embodiments, a minimum value of curvature radius of the curved passive segments may be greater than 20 um.

In some embodiments, a vertical distance between the curved passive segments and electrode metal may be greater than 1.0 um.

Embodiments of the present disclosure provide a high-speed silicon modulator without the microwave mode conversion and provide 50-ohm impedance matching to drivers simultaneously.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. The drawings may not necessarily be in scale so as to better present certain features of the illustrated subject matter.

DETAILED DESCRIPTION OF THE PREFERRED EMBODIMENTS

Overview

In a general aspect, an electro-optic device in accordance with the present disclosure may be fabricated on silicon (Si) or silicon-on-insulator (SOI) wafers to facilitate or otherwise implement electro-optic modulation. The device may include two curved waveguides on which applied electrical field causes a phase change in an optic signal propagated along the waveguides and converts it to an amplitude change of the optic signal. Either or both of the curved waveguides may have specially doped regions including PN junctions or MOS capacitors. The PN junctions or MOS capacitors may be alternatively connected to both slots of a coplanar waveguide forming the electrodes.

Example Implementations

Figure 3:
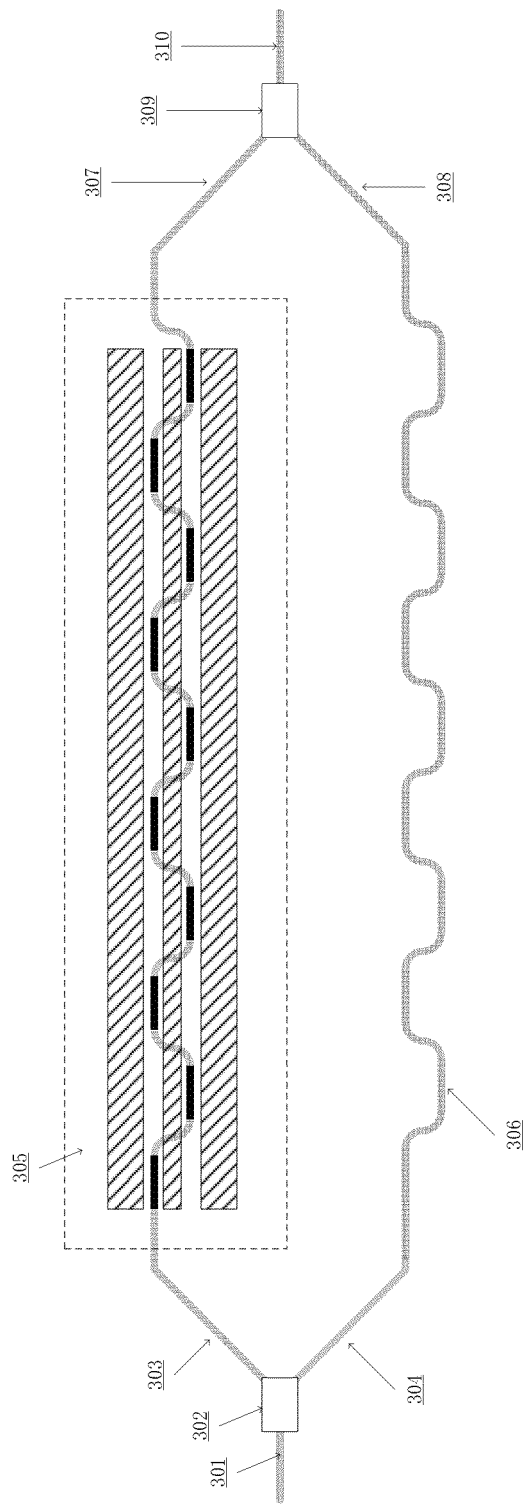
FIG. 3 illustrates a silicon modulator with specially designed phase shifter in accordance with the present disclosure.

In some embodiments, as shown in FIG. 3, an electro-optic device according to the present disclosure may include a Mach-Zehnder Interferometer (MZI) incorporating two deliberately designed phase shifters 305 and 306. The MZI may include an input waveguide 301, an input optical splitter 302, two arms with the phase shifter 305 and 306, an output optical splitter 309, and an output waveguide 310. The input and output splitter 302 and 309 may be based on Y-splitter, multimode inference (MMI), directional coupler, and other structures. The phase shifters 305 and 306 may be curved waveguides. The phase shifter 305 may include a CPW with nearly equal capacitance loading alternatively in both slots by PN junctions or MOS capacitors, and is interchangeably referred to as Alternative Capacitive Loading Coplanar Waveguide (ACLCPW) active phase shifter herein.

Figure 4A:
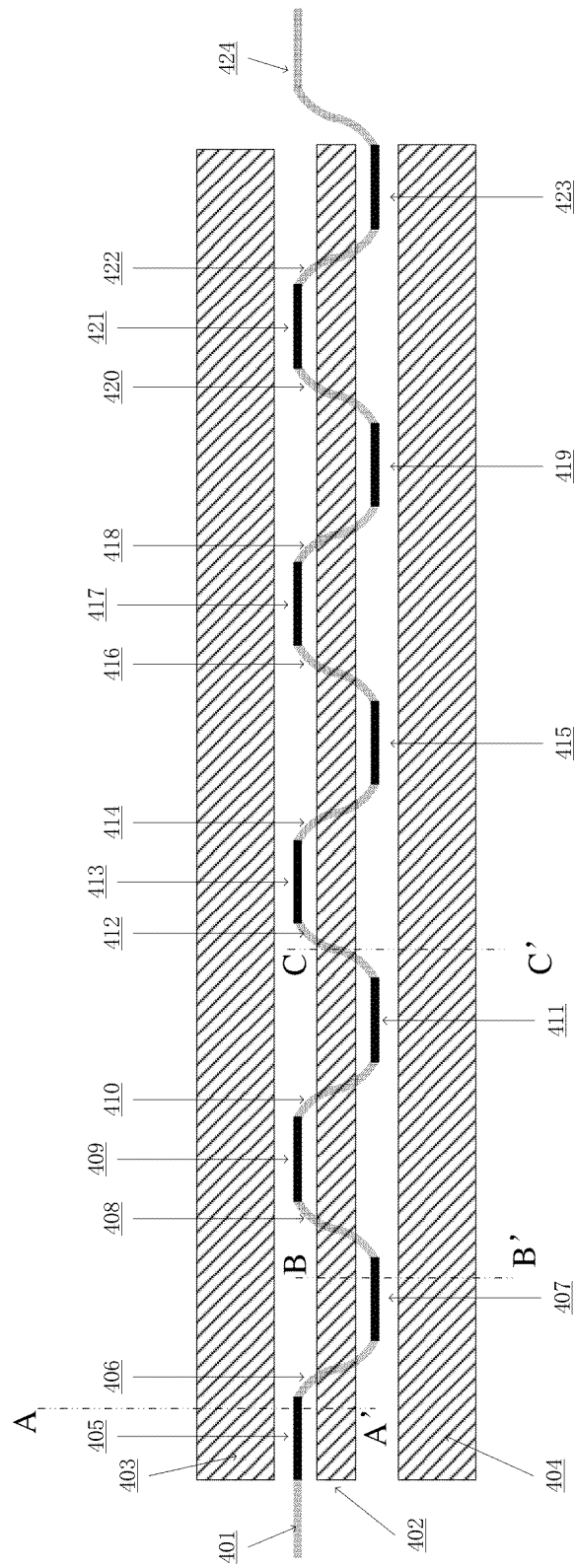
FIG. 4A illustrates a specially designed ACLCPW phase shifter in accordance with the present disclosure.

FIG. 4A shows an example detail structure of the ACLCPW active phase shifter 305. As shown in FIG. 4A, the ACLCPW phase shifter may include CPW electrodes (ground metal 403, signal metal 402, and ground metal 404), an input passive waveguide 401, an output passive waveguide 424, and a curved waveguide with alternative arrange of active phase shifter segments (405, 407, 409, 411, . . . and so on) and passive curved waveguide segments (406, 408, 410, 412, . . . and so on). The active phase shifter segments are alternatively loaded in both slots of the CPW electrodes and connected by the passive curved waveguide segments.

Figure 4B:
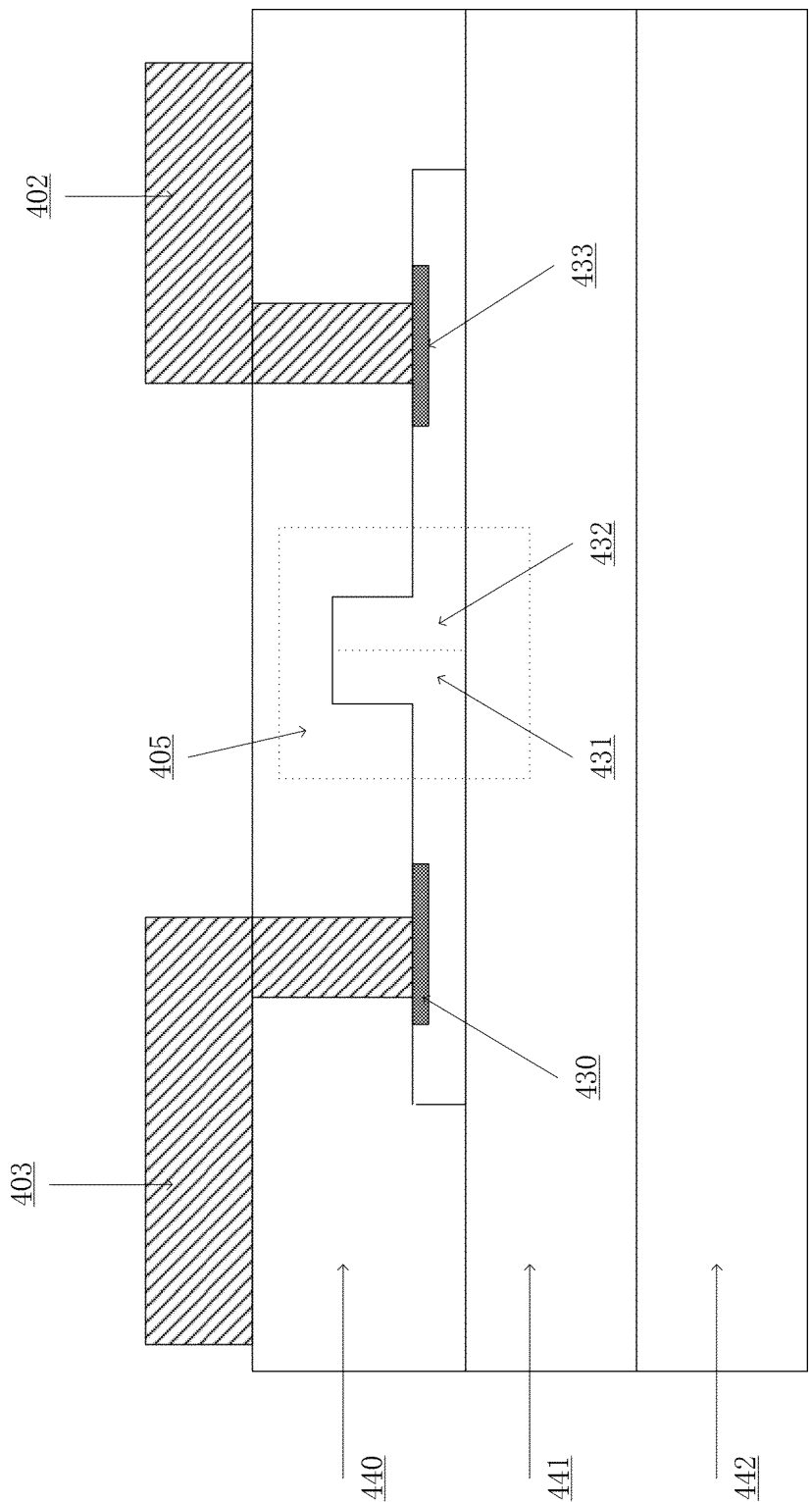
FIG. 4B is a cross-sectional view of the phase shifter of FIG. 4A along line AA'.
Figure 4C:
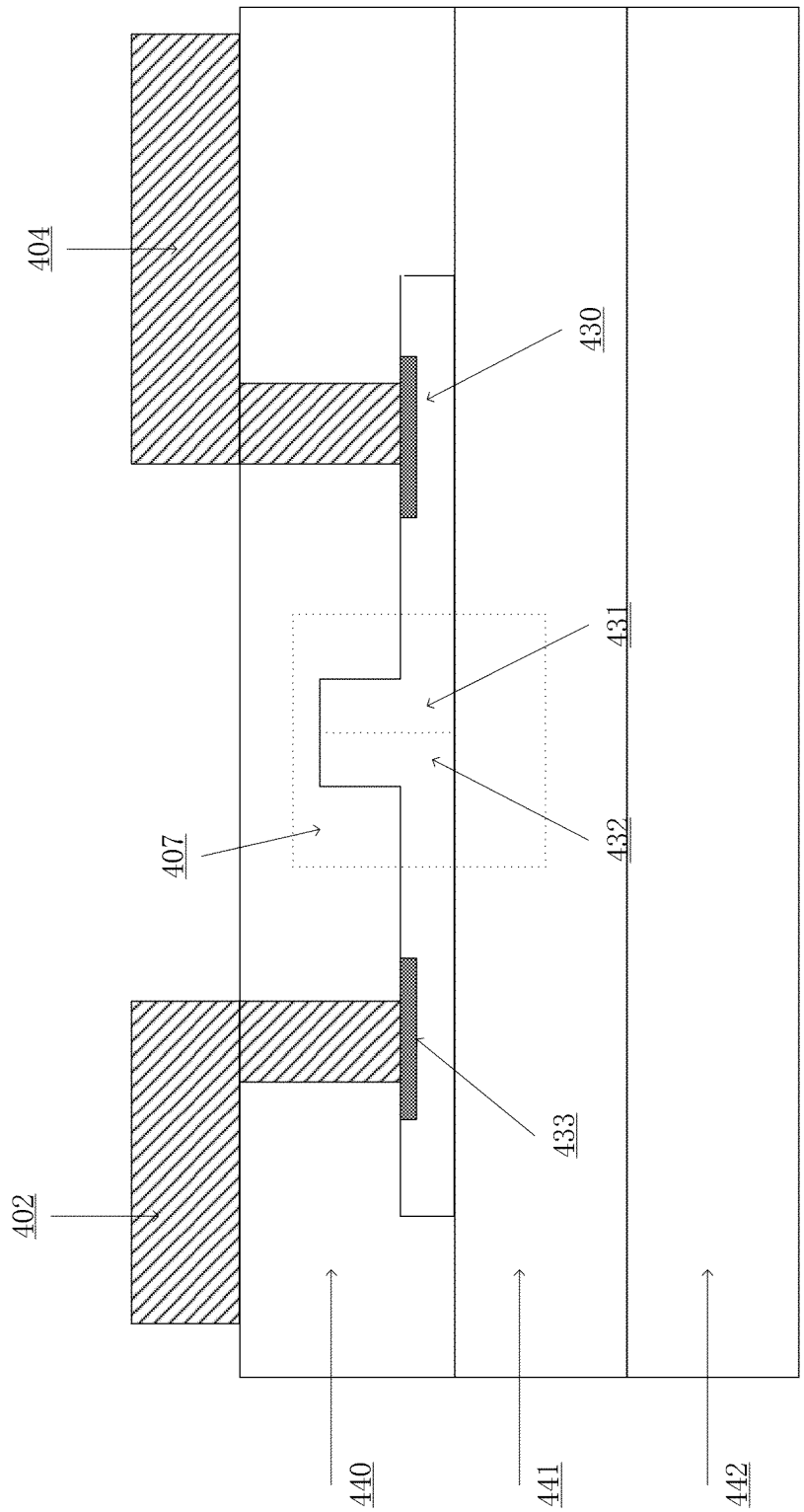
FIG. 4C is a cross-sectional view of the phase shifter of FIG. 4A along line BB'.

Cross-sectional views of the active phase shifter segment are shown in FIGS. 4B and 4C. In the illustrated embodiment, the active phase shifter may be built on a SOI substrate composed of silicon substrate 442, bottom oxide layer 441, and top dielectric layer 440. The active phase shifter segment also may include N-type dopants (or P-type dopants) doped silicon region 432 and the oppositely doped silicon region 431. That is, if silicon region 432 is doped with N-type dopants then silicon region 431 is doped with P-type dopants; and if silicon region 432 is doped with P-type dopants then silicon region 431 is doped with N-type dopants. Region 433 may be doped with the same type of dopants/impurities as region 432 but with higher density, and may form ohmic contact to the signal electrode metal 402. Region 430 may be highly doped with the same type of dopants/impurities as region 431 but with higher density, and also may form ohmic contact to the ground metal 403 or 404.

Figure 4D:
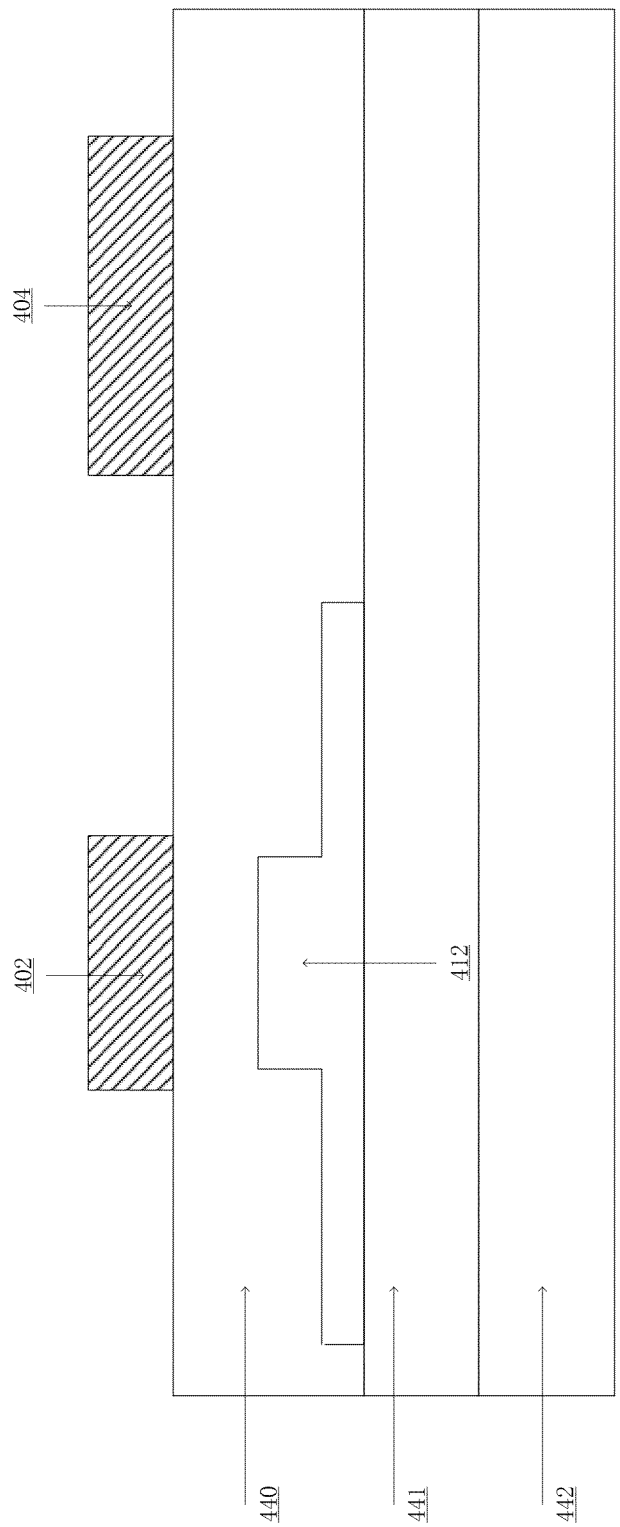
FIG. 4D is a cross-sectional view of the phase shifter of FIG. 4A along line CC'.

A cross-section view of the passive waveguide segment is shown in FIG. 4D. The silicon region 412 may be non-doped and may have no electric connection to the electrode metals. The vertical distance between silicon region 412 and electrode metal 402 may be generally greater than 1.0 um to avoid the optic absorption loss by the metal. In order to remove the extra loss coming from waveguide bending in the curved passive segment, the segment may be designed with the bending radius greater than 20 um or be continuously decreased to the minimum value of 20 um.

Figure 1:
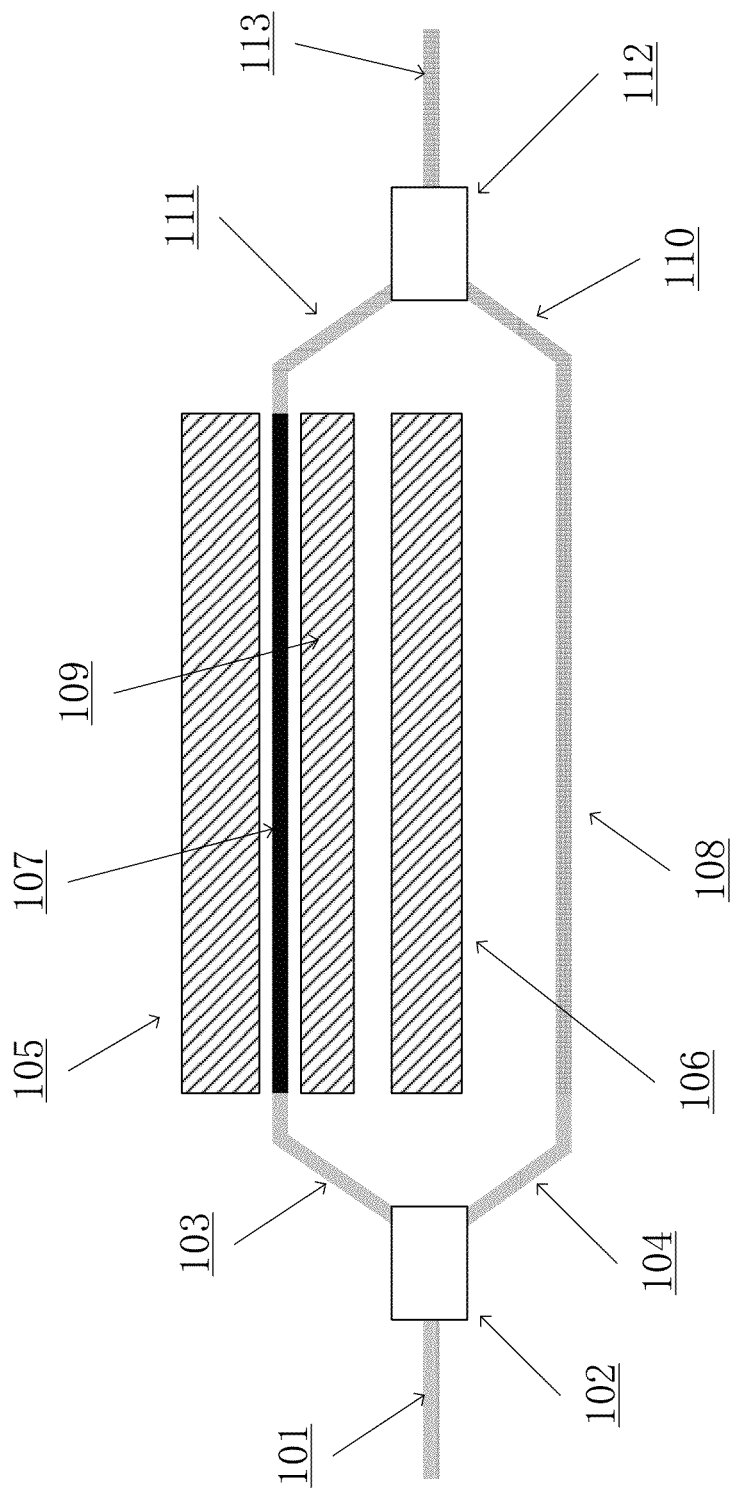
FIG. 1 illustrates a common electro-optic modulator with CPW electrode loaded with a phase shifter.
Figure 2:
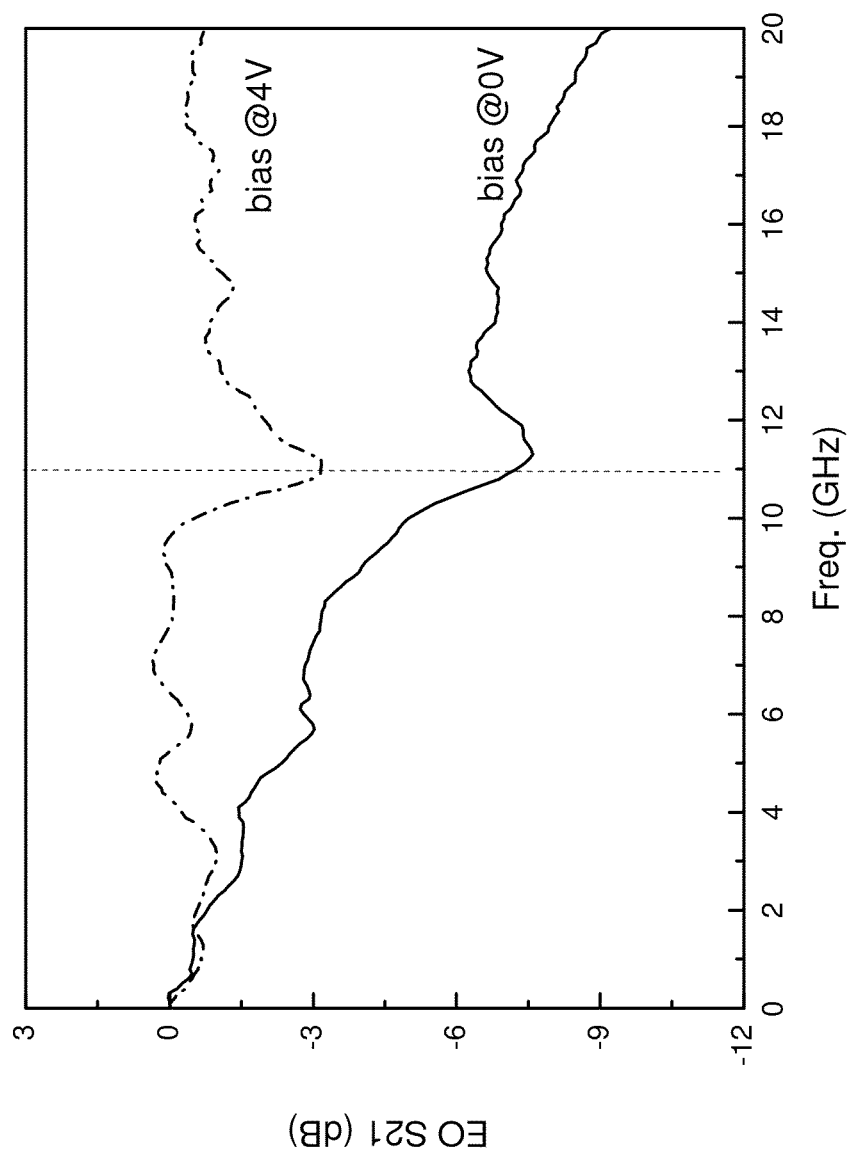
FIG. 2 illustrates an electro-optic modulation response of a modulator sample with common CPW electrode.
Figure 5:
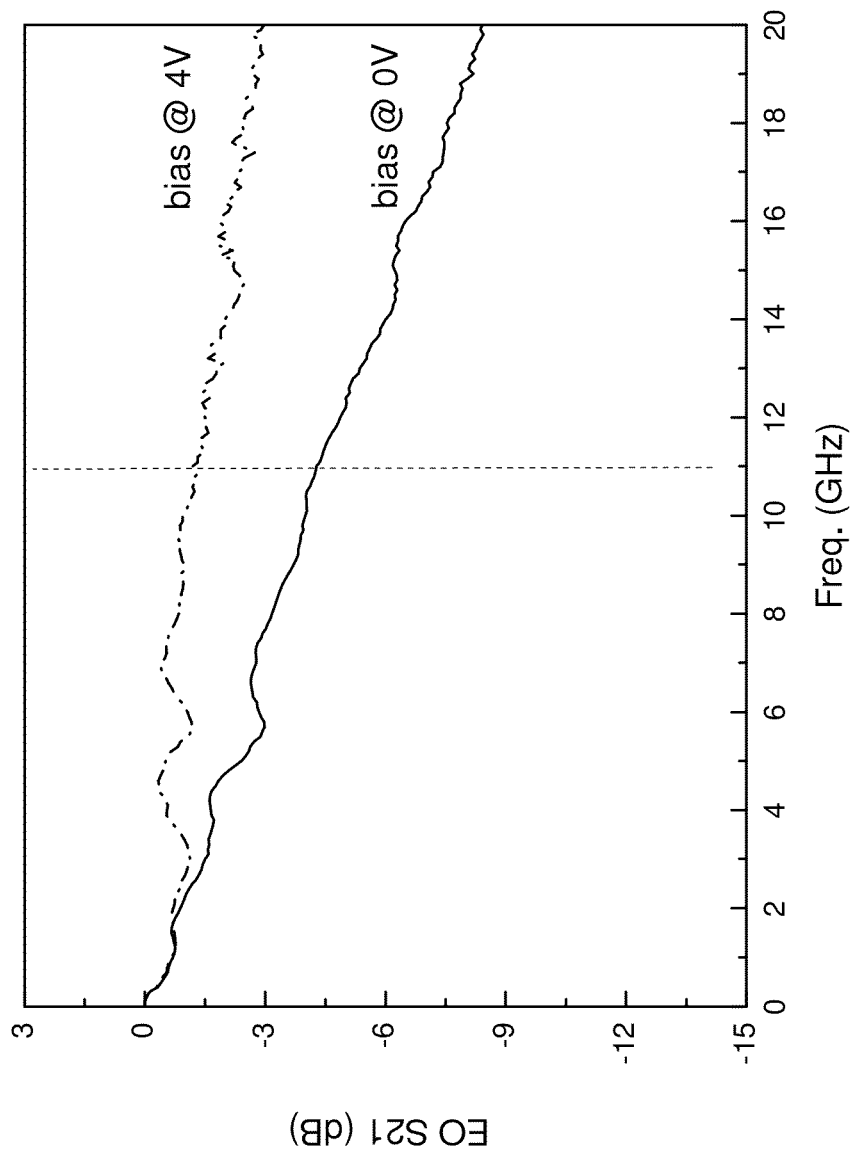
FIG. 5 illustrates electro-optic modulation response of a modulator with ACLCPW in accordance with the present disclosure.

One advantage of an ACLCPW in accordance with the present disclosure is the suppression of the mode conversion from asymmetric CPW. When the length of each active phase shifter segment is equal, the total loaded capacitance in the two slots of the CPW is also equal. By this balanced capacitive loading, the CPW becomes a symmetric one and the mode conversion due to asymmetric effect may be suppressed. Inventors of the present disclosure fabricated a silicon electro-optic modulator implementing an ACLCPW with electrode length similar to that shown in FIG. 2. The electro-optical response thereof is shown in FIG. 5. No dip from the mode conversion is observed in FIG. 5, and the 3 dB electro-optic bandwidth at 4V bias is increased from 11 GHz to 20 GHz as compared with that of FIG. 2.

Another advantage of the ACLCPW in accordance with the present disclosure is that it may be designed to have 50-ohm microwave impedance when the ratio of the phase shifter segment length to the distance between two phase shifter segments is adjusted according to the capacitance of the phase shifter. This may render the modulator easy to be tested with standard 50-ohm equipment and be driven by 50-ohm modulator driver.

Figure 6A:
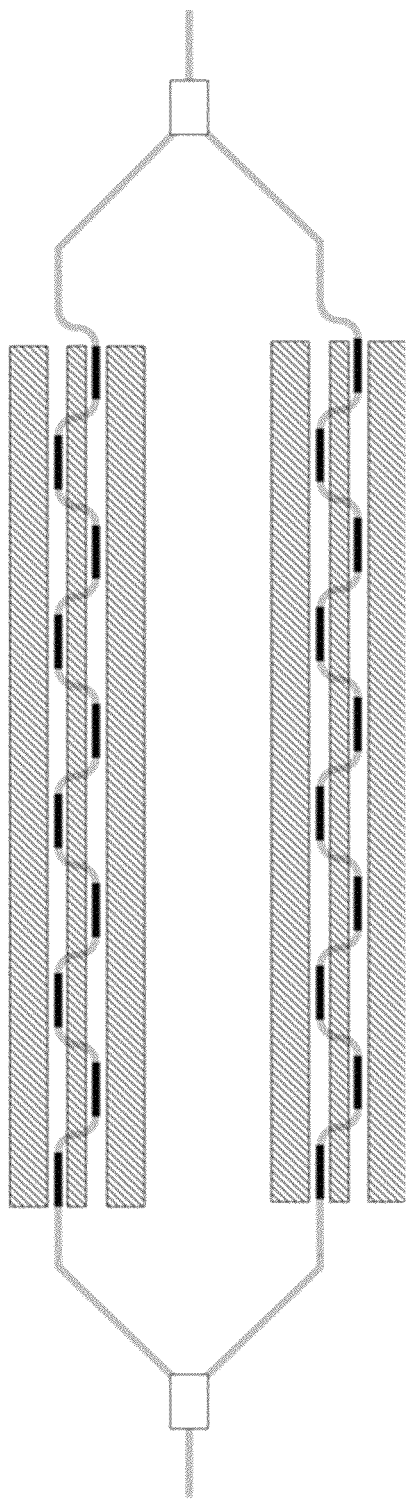
FIG. 6A illustrates a modulator implementing two ACLCPWs in accordance with the present disclosure.
Figure 6B:
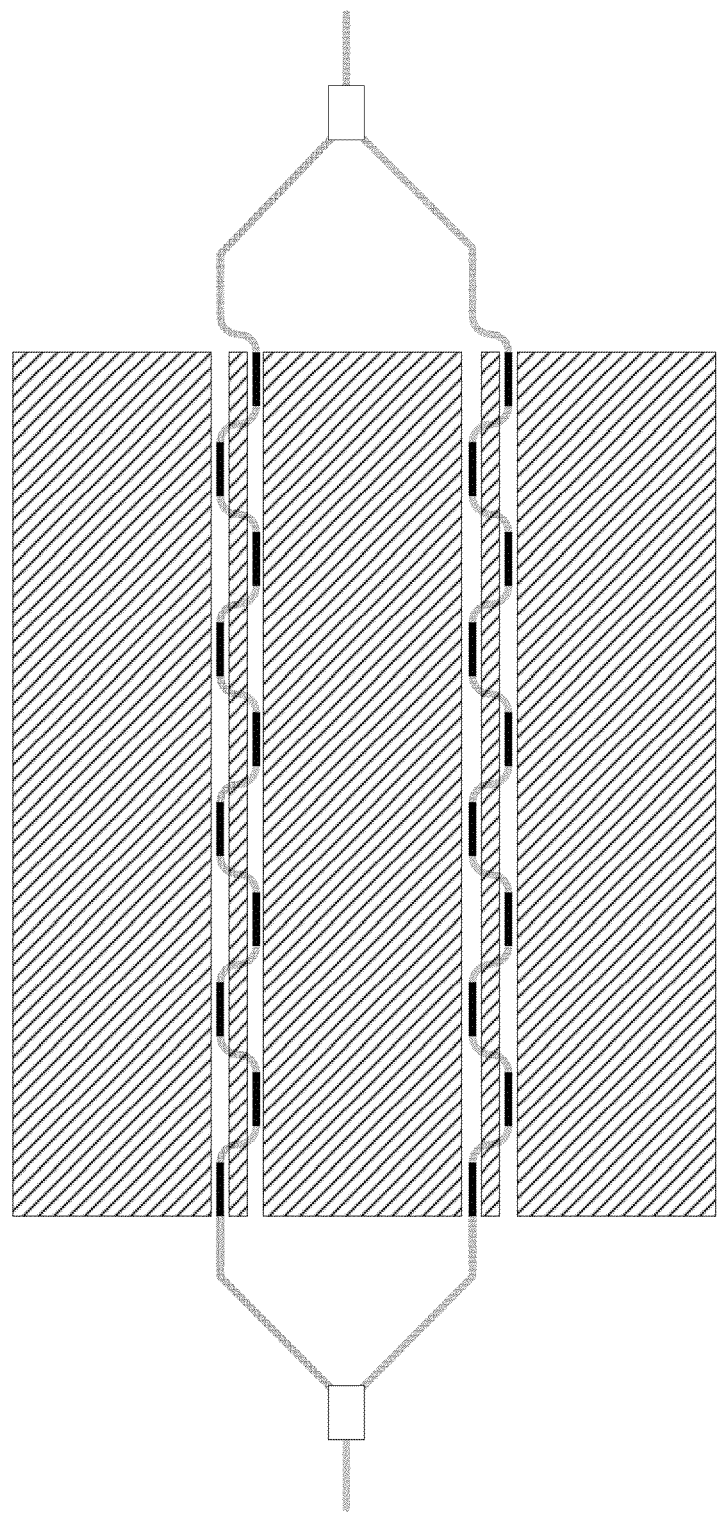
FIG. 6B illustrates a modulator implementing two ACLCPWs sharing one ground electrode in accordance with the present disclosure.

Other embodiments of the present disclosure may include the use of two ACLCPWs for both arms of the modulator, as shown in FIG. 6. The example embodiment illustrated in FIG. 6 may be used in differential drive scheme to increase the modulator performance such as the extinction ratio.

Additional Notes

Although some embodiments are disclosed above, they are not intended to limit the scope of the present disclosure. It will be apparent to those skilled in the art that various modifications and variations can be made to the disclosed embodiments of the present disclosure without departing from the scope or spirit of the present disclosure. In view of the foregoing, the scope of the present disclosure shall be defined by the following claims and their equivalents.

What is claimed is:

1. An alternate capacitance-loaded coplanar waveguide (ACLCPW) structure, comprising:
   a ground-signal-ground (GSG) coplanar waveguide (CPW) structure, comprising:
     a first ground metal;
     a signal metal;
     a second ground metal;
     a first slot located between the first ground metal and the signal metal; and
     a second slot located between the second ground metal and the signal metal; and
   a phase shifter alternately located in the first slot and the second slot, the phase shifter periodically comprising:
     a first active segment located in the first slot, comprising a first contact region of a first type connected to the first ground metal and a second contact region of a second type connected to the signal metal;
     a second curved passive segment configured to form a waveguide transition from the first slot to the second slot;
     a third active segment located in the second slot, comprising a third contact region of the first type connected to the second ground metal and a fourth contact region of the second type connected to the signal metal; and
     a fourth curved passive segment configured to form the waveguide transition from the second slot to the first slot,
     wherein the first active segment, the second curved passive segment, the third active segment and the fourth curved passive segment of the phase shifter form a periodically alternating capacitance loading between the first and second slots of the CPW structure.

2. The structure of claim 1, wherein the phase shifter comprises two to fifty periods of repeating structures comprising the first active segment, the second curved passive segment, the third active segment and the fourth curved passive segments.

3. The structure of claim 1, wherein a ratio of a total length of the first active segment and the third active segment of the phase shifter to a total length of the first active segment, the second curved passive segment, the third active segment and the fourth curved passive segment of the phase shifter is within a range of 0.1 to 0.9 to provide a coplanar waveguide (CPW) with 20 to 75-ohm equivalent microwave impedance.

4. The structure of claim 1, wherein a length of the first active segment and the third active segment of the phase shifter is in a range of 10 um to 1.0 mm.

5. The structure of claim 1, wherein the first active segment and the third active segment of the phase shifter are of a PN junction type or a MOS capacitor type.

6. The structure of claim 1, wherein a minimum value of curvature radius of the second curved passive segment and the fourth curved passive segment of the phase shifter is greater than 20 um.

7. The structure of claim 1, wherein a vertical distance between the second and fourth curved passive segments and electrode metal is greater than 1.0 um.

8. The structure of claim 1, wherein the first active segment and the third active segment of the phase shifter have a same segment length or different segment lengths, and wherein the second curved passive segment and the fourth curved passive segment of the phase shifter have a same segment length or different segment lengths.

9. The structure of claim 1, wherein the first type is P type and the second type contact is N type, or the first type contact is an N-type contact region and the second type contact is P-type contact region.

10. The structure of claim 1, wherein the first type is N type and the second type contact is P type.

* * * * *